(12) United States Patent
Arai

(10) Patent No.: US 11,542,191 B2
(45) Date of Patent: Jan. 3, 2023

(54) GLASS FOR MEDICINE CONTAINER AND GLASS TUBE FOR MEDICINE CONTAINER

(71) Applicant: Nippon Electric Glass Co., Ltd., Shiga (JP)

(72) Inventor: Satoshi Arai, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 86 days.

(21) Appl. No.: 16/648,878

(22) PCT Filed: Oct. 16, 2018

(86) PCT No.: PCT/JP2018/038440
§ 371 (c)(1),
(2) Date: Mar. 19, 2020

(87) PCT Pub. No.: WO2019/078188
PCT Pub. Date: Apr. 25, 2019

(65) Prior Publication Data
US 2020/0283331 A1    Sep. 10, 2020

(30) Foreign Application Priority Data

Oct. 20, 2017 (JP) .............................. JP2017-203699

(51) Int. Cl.
| | | |
|---|---|---|
| B32B 15/04 | (2006.01) | |
| B32B 17/06 | (2006.01) | |
| C03C 3/11 | (2006.01) | |
| C03C 3/091 | (2006.01) | |
| C03C 4/02 | (2006.01) | |
| C03C 4/18 | (2006.01) | |
| C03C 3/085 | (2006.01) | |

(52) U.S. Cl.
CPC ............... *C03C 3/11* (2013.01); *C03C 3/085* (2013.01); *C03C 3/091* (2013.01); *C03C 4/02* (2013.01); *C03C 4/18* (2013.01); *C03C 2204/00* (2013.01)

(58) Field of Classification Search
CPC ................. C03C 3/085; C03C 4/02

USPC ................................. 428/34.4, 426
See application file for complete search history.

(56) References Cited

U.S. PATENT DOCUMENTS

| 10,099,956 B2 * | 10/2018 | Choju ............... C03C 3/087 |
| 2005/0061033 A1 * | 3/2005 | Petrany ............... C03C 3/093 |
| | | 65/134.9 |
| 2015/0246846 A1 * | 9/2015 | Choju ................. B65D 1/40 |
| | | 428/34.4 |

FOREIGN PATENT DOCUMENTS

| JP | 38-5014 | | 4/1963 | |
| JP | 40-3255 | | 2/1965 | |
| JP | 2608535 | | 5/1997 | |
| JP | 2014-88293 | * | 5/2014 | |
| JP | 2014088293 A | * | 5/2014 | ............... C03C 3/11 |

OTHER PUBLICATIONS

JP403255 translation, 1965.*
JP2014088293 translation, 2014.*
JP2014-88293 English Machine translation, 2014.*
International Search Report dated Dec. 4, 2018 in International (PCT) Application No. PCT/JP2018/038440.
International Preliminary Report on Patentability and Written Opinion of the International Searching Authority dated Apr. 21, 2020 in International (PCT) Application No. PCT/JP2018/038440.

* cited by examiner

*Primary Examiner* — Lauren R Colgan
(74) *Attorney, Agent, or Firm* — Wenderoth, Lind & Ponack, L.L.P.

(57) ABSTRACT

The present invention relates to a glass for a pharmaceutical container that is excellent in ultraviolet shielding ability, and is also excellent in chemical durability. The glass for a pharmaceutical container of the present invention includes as a glass composition, in terms of mass %, 67% to 81% of $SiO_2$, more than 4% to 7% of $Al_2O_3$, 7% to 14% of $B_2O_3$, 3% to 12% of $Na_2O+K_2O$, 0% to 1.8% of CaO+BaO, 0.5% to less than 2% of $Fe_2O_3$, and 1% to 5% of $TiO_2$, and satisfies a relationship of CaO/BaO≤0.5.

14 Claims, No Drawings

GLASS FOR MEDICINE CONTAINER AND GLASS TUBE FOR MEDICINE CONTAINER

TECHNICAL FIELD

The present invention relates to a glass for a pharmaceutical container and a glass tube for a pharmaceutical container that are each excellent in ultraviolet shielding ability, and are each also excellent in chemical durability.

BACKGROUND ART

Various glasses have hitherto been used as materials for containers to be filled for storing pharmaceuticals. While the pharmaceuticals are roughly divided into two kinds: an oral drug and a parenteral drug, in particular, the parenteral drug is directly administered to blood of a patient as a drug solution filled and stored in a glass container, and hence the glass container is required to have significantly high quality. Pharmaceutical containers have two kinds of color tones: colorless and colored. Out of such pharmaceutical containers, the colored container is required to have a function of blocking ultraviolet light so that a pharmaceutical included therein is not altered through irradiation with light. For example, in the case of a drug containing Vitamin C, Vitamin C may be altered with ultraviolet light. As a method of solving such problem, there has been developed a glass for a pharmaceutical container in which the glass is colored to have a function of blocking ultraviolet light (for example, see Patent Literatures 1 and 2). In addition, in pharmacopoeias of various countries, with regard to a colored glass for a pharmaceutical container, an upper limit of a transmittance within a specific wavelength range is specified.

In addition, the pharmaceutical container is required not to alter components of a drug solution filled therein owing to an eluted material from the container. When glass components are eluted into the drug solution, there is a risk in that the properties of the drug solution are altered, which affects the health of a patient and even the life of the patient. Therefore, in the pharmacopoeias of various countries, the elution amounts of the glass components of the glass for a pharmaceutical container are specified.

In general, a borosilicate glass is used as the glass for a pharmaceutical container. Moreover, a colored borosilicate glass for a pharmaceutical container having a function of blocking ultraviolet light includes, as a glass composition, $SiO_2$, $Al_2O_3$, $B_2O_3$, $Na_2O$, $K_2O$, CaO, BaO, $Fe_2O_3$, $TiO_2$, and a small amount of a fining agent.

Incidentally, in recent years, many kinds of new drugs have been created through rapid advances in pharmacology, and also a drug to be filled in the pharmaceutical container has been changed. A relatively inexpensive drug, such as a blood coagulant or an anesthetic drug, has hitherto been mainly filled therein, but recently, a prophylactic agent, such as an influenza vaccine, or a significantly expensive drug, such as an anticancer drug, has been often filled therein. Along with this, the borosilicate glass for a pharmaceutical container, which forms a vial or an ampoule, is required to have higher chemical durability (hydrolytic resistance, alkali resistance, acid resistance, and the like) than ever before. Moreover, the colored borosilicate glass for a pharmaceutical container may also be similarly required to have such high chemical durability.

In Patent Literature 1, there is disclosed an amber colored pharmaceutical glass having the above-mentioned components. However, it is hard to say that such glass satisfies the chemical durability required in recent years.

In addition, in Patent Literature 2, there is described that, in a glass having high chemical durability, for example, the content of an alkali metal oxide, such as $Li_2O$, $Na_2O$, or $K_2O$, or an alkaline earth metal oxide, such as MgO, CaO, SrO, or BaO, contained in the glass is reduced, or the content of $Al_2O_3$ contained therein is increased. However, it is insufficient to merely increase or reduce the content of each component for satisfying the chemical durability required in recent years.

CITATION LIST

Patent Literature 1: JP 38-5014 B
Patent Literature 2: JP 2608535 B2

SUMMARY OF INVENTION

Technical Problem

The present invention has been made in view of the above-mentioned circumstances, and the present invention provides a colored glass for a pharmaceutical container and a colored glass tube for a pharmaceutical container that are each excellent in ultraviolet shielding ability, and are each also excellent in chemical durability.

Solution to Problem

The inventor of the present invention has made various investigations, and as a result, has found that the above-mentioned problems can be solved by optimizing the contents of alkaline earth metal oxides, specifically by strictly controlling the total content of CaO and BaO serving as the alkaline earth metal oxides, and the ratio between CaO and BaO. Thus, the finding is proposed as the present invention.

That is, according to one embodiment of the present invention, there is provided a glass for a pharmaceutical container, which comprises as a glass composition, in terms of mass %, 67% to 81% of $SiO_2$, more than 4% to 7% of $Al_2O_3$, 7% to 14% of $B_2O_3$, 3% to 12% of $Na_2O+K_2O$, 0% to 1.8% of CaO+BaO, 0.5% to less than 2% of $Fe_2O_3$, and 1% to 5% of $TiO_2$, and satisfies a relationship of CaO/BaO≤0.5.

Here, the "$Na_2O+K_2O$" means the total of the contents of $Na_2O$ and $K_2O$. The "CaO+BaO" means the total of the contents of CaO and BaO. The "CaO/BaO≤0.5" means that a value obtained by dividing the content of CaO by the content of BaO is 0.5 or less.

The glass for a pharmaceutical container according to the one embodiment of the present invention is colored in reddish-brown, that is, amber colored by virtue of $Fe_2O_3$ and $TiO_2$, and is thus excellent in ultraviolet shielding ability.

Further, the values for CaO+BaO and CaO/BaO are controlled as described above, and hence the elution of CaO and BaO from the glass is reduced. Thus, more excellent chemical durability, in particular, hydrolytic resistance can be obtained.

Besides, the value for $Na_2O+K_2O$ is controlled as described above, and hence the glass for a pharmaceutical container according to the one embodiment of the present invention is easily processed into a container, such as an ampoule or a vial. Accordingly, both satisfactory hydrolytic resistance required for a pharmaceutical container and easy processability into a container, such as an ampoule or a vial, can be achieved.

In addition, it is preferred that the glass for a pharmaceutical container according to the one embodiment of the present invention comprise as a glass composition, in terms of mass %, 70% to 78% of $SiO_2$, 5% to 7% of $Al_2O_3$, 8% to 11% of $B_2O_3$, 6% to 10% of $Na_2O+K_2O$, 0% to 1.8% of CaO+BaO, 0.8% to 1.2% of $Fe_2O_3$, and 2% to 5% of $TiO_2$, and satisfy a relationship of CaO/BaO≤0.3.

With this, the glass for a pharmaceutical container that is colored in a desired color and exhibits more excellent chemical durability can be easily obtained.

It is preferred that the glass for a pharmaceutical container according to the one embodiment of the present invention comprise, as a glass composition, in terms of mass %, 9% to 11% of $B_2O_3$.

With this, the glass that has more satisfactory processability into a container can be obtained.

It is preferred that the glass for a pharmaceutical container according to the one embodiment of the present invention comprise, as a glass composition, in terms of mass %, 0% to 1% of CaO and 0.1% to 2% of BaO.

With this, the glass that has excellent hydrolytic resistance preferred for applications as a pharmaceutical container can be obtained.

It is preferred that the glass for a pharmaceutical container according to the one embodiment of the present invention have a consumption amount of 0.02 mol/L hydrochloric acid per unit glass mass of 0.035 mL or less in a hydrolytic resistance test by a glass grains test method in conformity with the European Pharmacopoeia 7.0. The "hydrolytic resistance in the test in conformity with the European Pharmacopoeia 7.0" as used herein refers to the degree of an alkali elution amount determined by the following method.
(1) A glass sample is crushed in an alumina mortar and classified into a particle diameter of from 300 μm to 425 μm with a sieve.
(2) The resultant powder sample is washed with distilled water and ethanol and dried in an oven at 140° C.
(3) 10 g of the powder sample after the drying is loaded into a quartz flask, and 50 mL of distilled water is further added thereto and the flask is covered with a closure, followed by treatment in an autoclave. The treatment is performed under the following treatment conditions: a temperature is increased at a rate of 1° C./min from 100° C. to 121° C., and is then retained at 121° C. for 30 minutes, and is reduced at a rate of 0.5° C./min to 100° C.
(4) After the treatment in an autoclave, the solution in the quartz flask is transferred to another beaker, the quartz flask is further washed with 15 mL of distilled water, and also the washing liquid is added to the beaker.
(5) A methyl red indicator solution is added to the beaker, and the content is titrated with a 0.02 mol/L hydrochloric acid solution.
(6) The consumption amount of hydrochloric acid required for neutralization is converted to the consumption amount of hydrochloric acid per gram of glass.

In addition, the "having hydrolytic resistance of at least Type I in the test in conformity with the European Pharmacopoeia 7.0" means that the consumption amount of hydrochloric acid determined by the above-mentioned test is 0.1 ml/g or less.

It is preferred that the glass for a pharmaceutical container according to the one embodiment of the present invention have a working point of 1,200° C. or less. The "working point" as used herein means a temperature at which the glass has a viscosity of $10^4$ dPa·s.

According to the above-mentioned configuration, a processing temperature at the time of manufacturing a glass container, such as an ampoule or a vial, from a glass tube can be reduced, and hence the evaporation amount of an alkali component in the glass can be significantly reduced. As a result, for example, a situation in which components of a drug solution to be stored in the glass container are altered or the pH of the drug solution is increased can be avoided.

It is preferred that the glass for a pharmaceutical container according to the one embodiment of the present invention have a transmittance at a wavelength of 450 nm of 15% or less when having a thickness of 1 mm.

According to one embodiment of the present invention, there is provided a glass for a container, which comprises as a glass composition, in terms of mass %, 67% to 81% of $SiO_2$, more than 4% to 7% of $Al_2O_3$, 7% to 14% of $B_2O_3$, 3% to 12% of $Na_2O+K_2O$, 0% to 1.8% of CaO+BaO, 0.5% to less than 2% of $Fe_2O_3$, and 1% to 5% of $TiO_2$, and satisfies a relationship of CaO/BaO≤0.5.

According to one embodiment of the present invention, there is provided a glass tube for a pharmaceutical container, comprising the above-mentioned glass for a pharmaceutical container.

According to one embodiment of the present invention, there is provided glass tube for a container, comprising the above-mentioned glass for a container.

DESCRIPTION OF EMBODIMENTS

The reasons why the composition ranges of components are limited are described. In the following description, the expression "%" means "mass %" unless otherwise specified.

$SiO_2$ is one of components that form a network structure of a glass. When the content of $SiO_2$ is too large, it becomes difficult to achieve a working point of 1,200° C. or less. When the content of $SiO_2$ is too small, it becomes difficult to vitrify the glass. In addition, the glass is increased in thermal expansion coefficient, and is thus liable to be reduced in thermal shock resistance. Therefore, the content thereof is preferably 65% or more, 67% or more, 69% or more, or 70% or more, particularly preferably 71% or more, and is preferably 81% or less, 78% or less, 76% or less, or 75% or less, particularly preferably 73% or less. For example, the range of $SiO_2$ is desirably from 67% to 73%, particularly desirably from 70% to 73%.

$Al_2O_3$ is one of the components that form the network structure of the glass, and has an effect of improving the hydrolytic resistance of the glass. Therefore, the content thereof is preferably 3% or more, 4% or more, or more than 4%, particularly preferably 5% or more, and is preferably 10% or less, 9% or less, 8% or less, 7% or less, or 6% or less. The range of $Al_2O_3$ is desirably from more than 4% to 7%, particularly desirably from 5% to 7%. When the content of $Al_2O_3$ is too small, it becomes difficult to achieve the requirements of hydrolytic resistance of Type I in a test in conformity with the European Pharmacopoeia 7.0. Meanwhile, when the content of $Al_2O_3$ is too large, it becomes difficult to achieve a working point of 1,200° C. or less.

$B_2O_3$ has an effect of reducing the viscosity of the glass. When the content of $B_2O_3$ is too large, the chemical durability of the glass is reduced. When the content of $B_2O_3$ is too small, it becomes difficult to achieve a working point of 1,200° C. or less. Therefore, the content thereof is preferably 5% or more, 6% or more, 7% or more, or 8% or more, particularly preferably 9% or more, and is preferably 16% or less, 15% or less, 14% or less, 13% or less, or 12% or less, particularly preferably 11% or less. The content of $B_2O_3$ is desirably from 7% to 14%, particularly desirably from 8% to 11%.

$Li_2O$, $Na_2O$, and $K_2O$ serving as alkali metal oxides ($R_2O$) each have an effect of reducing the viscosity of the glass. However, when the total content of those components is large, an alkali elution amount from the glass is increased. Further, the thermal expansion coefficient is increased, and thus the thermal shock resistance is reduced. When the content of the alkali metal oxides is too small, it becomes difficult to achieve a working point of 1,200° C. or less. Therefore, the total content of $R_2O$ is preferably from 3% to 12%, from 4% to 10%, from 5% to 9%, or from 6% to 8%, particularly preferably from 7% to 8%.

As described above, $Li_2O$ has an effect of reducing the viscosity of the glass to increase the processability and the meltability of the glass. When the content of $Li_2O$ is too large, the alkali elution amount from the glass is increased. Further, the thermal expansion coefficient is increased, and thus the thermal shock resistance is reduced. When the content of $Li_2O$ is too small, it becomes difficult to achieve a working point of 1,200° C. or less. However, a raw material of $Li_2O$ is more expensive than those of other alkali metal oxides, which results in an increase in manufacturing cost. Therefore, the content of $Li_2O$ is preferably from 0% to 1%, particularly preferably from 0% to 0.5%.

$Na_2O$ is a component that reduces the viscosity of the glass as with $Li_2O$. When the content of $Na_2O$ is too large, the alkali elution amount from the glass is increased. Further, the thermal expansion coefficient is increased, and thus the thermal shock resistance is reduced. When the content of $Na_2O$ is too small, it becomes difficult to achieve a working point of 1,200° C. or less. Therefore, the content of $Na_2O$ is preferably from 0% to 12%, from 1% to 10%, from 3% to 8%, or from 4% to 7%, particularly preferably from 5% to 6%.

$K_2O$ is a component that reduces the viscosity of the glass as with $Li_2O$ and $Na_2O$. When the content of $K_2O$ is too large, the alkali elution amount from the glass is increased. Further, the thermal expansion coefficient is increased, and thus the thermal shock resistance is reduced. When the content of $K_2O$ is too small, it becomes difficult to achieve a working point of 1,200° C. or less. Therefore, the content of $K_2O$ is preferably from 0% to 12%, from 1% to 10%, from 1.2% to 7%, from 1.5% to 5%, or from 1.6% to 3%, particularly preferably from 2% to 3%.

As a result of investigations made from the two viewpoints of the characteristics of the glass and the manufacturing cost thereof, it is preferred that two components of $Na_2O$ and $K_2O$ coexist as alkali metal oxides contained in the glass. However, when the content of $Na_2O+K_2O$ is too large, the alkali elution amount from the glass is increased. Further, the thermal expansion coefficient is increased, and thus the thermal shock resistance is reduced. When the content of $Na_2O+K_2O$ is too small, it becomes difficult to achieve a working point of 1,200° C. or less. Therefore, the content of $Na_2O+K_2O$ is preferably 3% or more, 4% or more, 5% or more, or 6% or more, particularly preferably 7% or more, and is preferably 12% or less, 10% or less, or 9% or less, particularly preferably 8% or less. The content of $Na_2O+K_2O$ is desirably from 3% to 12%, from 3% to 9%, or from 6% to 10%, particularly desirably from 6% to 9%.

MgO, CaO, SrO, and BaO serving as alkaline earth metal oxides (R'O) each have an effect of reducing the viscosity of the glass. In addition, MgO, CaO, SrO, and BaO each also affect the alkali elution amount. When the content of the alkaline earth metal oxides is too large, the alkali elution amount from the glass is increased. Further, the thermal expansion coefficient is increased, and thus the thermal shock resistance is reduced. When the content of the alkaline earth metal oxides is too small, it becomes difficult to achieve a working point of 1,200° C. or less. Accordingly, the total content of the alkaline earth metal oxides is preferably from 0% to 5%, from 0.1% to 4%, from 0.3% to 3%, or from 0.5% to 2%, particularly preferably from 0.9% to 1.8%.

MgO has an effect of reducing the viscosity of the glass. In addition, MgO also affects the alkali elution amount. When the content of MgO is too large, the alkali elution amount from the glass is increased. Further, the thermal expansion coefficient is increased, and thus the thermal shock resistance is reduced. Therefore, the content of MgO is preferably from 0% to 4%, from 0% to 1%, or from 0% to 0.7%, particularly preferably from 0% to 0.4%.

CaO has an effect of reducing the viscosity of the glass. In addition, CaO also affects the alkali elution amount. When the content of CaO is too large, the alkali elution amount from the glass is increased. Further, the thermal expansion coefficient is increased, and thus the thermal shock resistance is reduced. Therefore, the content of CaO is preferably from 0% to 4%, from 0% to 1%, or from 0% to 0.7%, particularly preferably from 0% to 0.4%. A raw material of CaO is available more inexpensively than those of other alkaline earth metal oxides, and hence the manufacturing cost can be reduced.

SrO has an effect of reducing the viscosity of the glass. In addition, SrO also affects the alkali elution amount. When the content of SrO is too large, the alkali elution amount from the glass is increased. Further, the thermal expansion coefficient is increased, and thus the thermal shock resistance is reduced. Therefore, the content of SrO is preferably from 0% to 1%, particularly preferably from 0% to 0.5%.

BaO has an effect of reducing the viscosity of the glass. In addition, BaO also affects the alkali elution amount. When the content of BaO is too large, the alkali elution amount from the glass is increased. Further, the thermal expansion coefficient is increased, and thus the thermal shock resistance is reduced. When the content of BaO is too small, it becomes difficult to achieve a working point of 1,200° C. or less. Therefore, the content of BaO is preferably from 0% to 5%, from 0% to 2%, or from 0.1% to 1.8%, particularly preferably from 0.6% to 1.5%.

The alkaline earth metal oxides each have an effect of improving the devitrification resistance of the glass, and the magnitudes thereof become larger in the order of MgO<CaO<SrO<BaO. Accordingly, when BaO is preferentially selected as the alkaline earth metal oxide, the devitrification resistance of the glass can be improved most effectively. As a result, the productivity of the glass during manufacturing and processing of the glass can be improved.

In addition, when the contents of the alkaline earth metal oxides are the same, these glass components are less liable to be eluted into a drug solution or the like in the order of MgO>CaO>SrO>BaO, that is, in descending order of the number of atoms contained in the glass. Accordingly, when BaO is selected, the elution of the glass component can be suppressed most effectively.

As a result of investigations made from the two viewpoints of the characteristics of the glass and the manufacturing cost thereof, preferred alkaline earth metal oxides to be contained in the glass are CaO and BaO. When the content of CaO+BaO is too large, the alkali elution amount from the glass is increased. Further, the thermal expansion coefficient is increased, and thus the thermal shock resistance is reduced. When the content of CaO+BaO is too small, it becomes difficult to achieve a working point of 1,200° C. or less. Therefore, the content thereof is preferably 0% or more, 0.1% or more, 0.3% or more, or 0.5% or more, particularly preferably 0.9% or more, and is preferably 5% or less, 4% or less, 3% or less, or 2% or less, particularly preferably 1.8% or less. The content of CaO+BaO is desirably from 0% to 1.8%.

In addition, the contents of CaO and BaO are preferably such that the relationship of CaO≤BaO is satisfied, and are more preferably such that the relationship of CaO<BaO is satisfied. Further, a particularly preferred relationship between the contents of CaO and BaO is as follows: CaO/BaO, that is, a value obtained by dividing the content of CaO by the content of BaO is preferably from 0 to 0.5, from 0 to 0.45, from 0 to 0.37, from 0 to 0.3, or from 0 to 0.25, particularly preferably from 0 to 0.1. When the CaO/BaO is too large, the hydrolytic resistance deteriorates. As the CaO/BaO becomes smaller, the glass having more excellent hydrolytic resistance can be obtained.

$Fe_2O_3$ is an essential component for coloring of the glass. When the content of $Fe_2O_3$ is too large, the elution amount of an Fe component from the glass is increased. When the content of $Fe_2O_3$ is too small, an ultraviolet shielding ability required for a pharmaceutical container is not obtained. Therefore, the content of $Fe_2O_3$ is preferably 0.1% or more, 0.6% or more, 0.8% or more, or 0.85% or more, particularly preferably 0.9% or more, and is preferably 3% or less, 2% or less, 1.4% or less, or 1.2% or less, particularly preferably 1.1% or less. The content of $Fe_2O_3$ is desirably from 0.5% to less than 2%, particularly desirably from 0.8% to 1.2%.

$TiO_2$ is an essential component for coloring of the glass as with $Fe_2O_3$, and it is preferred that $Fe_2O_3$ and $TiO_2$ coexist in the glass in order to obtain the ultraviolet shielding ability of the present invention. When the content of $TiO_2$ is too large, the elution amount of a Ti component from the glass is increased. When the content of $TiO_2$ is too small, the ultraviolet shielding ability required for a pharmaceutical container is not obtained. Therefore, the content of $TiO_2$ is 0.1% or more, 1% or more, 1.6% or more, or 2% or more, particularly preferably 2.1% or more, and is preferably 5% or less, 4.5% or less, 4.1% or less, or 3% or less, particularly preferably 2.6% or less. The content of $TiO_2$ is desirably from 1% to 5%, particularly desirably from 2% to 5%.

The glass for a pharmaceutical container of the present invention may comprise one or more kinds selected from, for example, F, Cl, $Sb_2O_3$, $As_2O_3$, $SnO_2$, and $Na_2SO_4$ as a fining agent. In this case, the standard content of the fining agent is, in terms of the total content, 5% or less, and is particularly preferably 1% or less, still more preferably 0.5% or less.

In addition, the glass for a pharmaceutical container of the present invention may comprise any other component than those described above. For example, in order to improve the chemical durability, a viscosity at high temperature, and the like, ZnO, $P_2O_5$, $Cr_2O_3$, PbO, $La_2O_3$, $WO_3$, $Nb_2O_5$, $Y_2O_3$, and the like may each be added up to 3%.

When the present invention is performed, a component that has an action of reducing the iron component in the glass, such as carbon, metal aluminum, or metal sulfur, may be incorporated. While the content of a reducing agent may be appropriately adjusted in view of the transmittance or the molten state of the glass, the content of the reducing agent is, in terms of the total content, 5% or less, preferably 1% or less, more preferably 0.5% or less, most preferably 0.1% or less. In addition, in order to adjust the degree of reduction, iron raw materials having different redox states, such as ferric oxide and triiron tetraoxide, may be used.

In addition, components such as $H_2$, $CO_2$, CO, $H_2O$, He, Ne, Ar, and $N_2$ may each be incorporated up to 0.1% as an impurity. In addition, the amounts of noble metal elements mixed therein, such as Pt, Rh, and Au, are each preferably 500 ppm or less, more preferably 300 ppm or less.

The glass for a pharmaceutical container of the present invention has a consumption amount of 0.02 mol/L hydrochloric acid per unit glass mass of preferably 0.040 mL or less, less than 0.038 mL, or less than 0.035 mL, particularly preferably 0.033 mL or less, most preferably 0.030 mL or less in a hydrolytic resistance test by a glass grains test method in conformity with the European Pharmacopoeia 7.0. When the consumption amount of hydrochloric acid is more than 0.1 mL, there is a risk in that, when a container, such as an ampoule or a vial, is produced, and a drug solution is filled and stored therein, the elution of the glass components, in particular, an alkali component is significantly increased to cause alteration of components of the drug solution.

In addition, the glass for a pharmaceutical container of the present invention has a working point of preferably 1,250° C. or less, 1,230° C. or less, 1,200° C. or less, or 1,190° C. or less, particularly preferably 1,180° C. or less. When the working point becomes higher, a processing temperature at the time of processing a glass tubing into an ampoule or a vial also becomes higher, and the evaporation of the alkali component contained in the glass is significantly increased. The evaporated alkali component adheres to an inner wall of the glass tubing, and such glass tubing is processed into a glass container. When a drug solution is filled and stored in such glass container, the glass container causes alteration of the drug solution. In addition, when the glass has an excessively large content of a boron component, also the evaporation of boron occurs. The boron adheres to the inner wall of the glass tubing as with the alkali component, which results in the formation of an alteration layer having inferior hydrolytic resistance to that in the case of having the original glass composition.

In addition, the glass for a pharmaceutical container of the present invention has a temperature at which the glass has a viscosity of $10^{2.5}$ dPa·s of preferably 1,700° C. or less, more preferably 1,650° C. or less, most preferably 1,600° C. or less.

Incidentally, with regard to light shielding properties of a colored pharmaceutical container, it is specified in the European Pharmacopoeia or the United States Pharmacopeia that a light transmittance measured at wavelength intervals of 20 nm in a short-wavelength region (from 290 nm to 450 nm) is 50% or less. Therefore, the glass for a pharmaceutical container of the present invention has a light transmittance measured at wavelength intervals of 20 nm in the short-wavelength region (from 290 nm to 450 nm) of preferably 50% or less, more preferably 40% or less, particularly preferably 30% or less. With this, the European Pharmacopoeia or the United States Pharmacopeia is easily satisfied.

In particular, the glass for a pharmaceutical container of the present invention preferably has a transmittance at a wavelength of 450 nm of 15% or less when having a thickness of 1 mm. With this, the glass that satisfies the European Pharmacopoeia or the United States Pharmacopeia can be easily obtained.

As described above, the glass for a pharmaceutical container of the present invention is suitable for applications as a pharmaceutical container, but may be used as a glass for a container other than the pharmaceutical container by virtue of being excellent in hydrolytic resistance and light shielding properties.

A glass for a container of the present invention has a glass composition in common with the glass composition of the glass for a pharmaceutical container of the present invention having been specifically described, and the description thereof is omitted.

Next, a manufacturing method for a glass tube for a pharmaceutical container of the present invention is described. The following description is given of an example using a Danner method.

First, glass raw materials are blended so as to give the above-mentioned glass composition, to thereby produce a glass batch. Next, the glass batch is continuously loaded into a melting kiln at from 1,550° C. to 1,700° C. to be melted and fined, and then, while the resultant molten glass is wound around an external surface of a rotating cylindrical refractory, the molten glass is drawn from a tip of the refractory with blowing of air, to thereby form the glass into a tube shape from the tip.

While an example of the resultant tubular glass is not limited thereto, the tubular glass may have an outer diameter of from 1 mm to 100 mm, from 3 mm to 70 mm, or from 7 mm to 55 mm. In addition, for example, the tubular glass may have a thickness of from 0.1 mm to 10 mm, from 0.2 mm to 5 mm, or from 0.4 mm to 3 mm.

Subsequently, the tubular glass having been drawn is cut into a predetermined length. Thus, a glass tube for a pharmaceutical container is obtained. The glass tube thus obtained is subjected to manufacturing of a vial or an ampoule.

As described above, the glass tube for a pharmaceutical container of the present invention is suitable for manufacturing of a pharmaceutical container, but may be subjected to manufacturing of a container other than the pharmaceutical container.

Without limitation to the Danner method, the glass tube for a pharmaceutical container of the present invention may be manufactured by any method that has hitherto been well known. For example, a Vello method and a down-draw method are each useful as the manufacturing method for the glass tube for a pharmaceutical container of the present invention.

In addition, for a glass tube for a container of the present invention, the manufacturing method having been described for the glass tube for a pharmaceutical container of the present invention may be appropriately adopted, and the description thereof is omitted.

EXAMPLES

The present invention is described below by way of Examples.

Examples (Sample Nos. 1 to 41 and 45 to 50) and Comparative Examples (Sample Nos. 42 to 44) of the present invention are shown in Tables 1 to 5.

TABLE 1

| Mass % | No. 1 | No. 2 | No. 3 | No. 4 | No. 5 | No. 6 |
|---|---|---|---|---|---|---|
| $SiO_2$ | 72.17 | 71.77 | 72.17 | 71.97 | 71.42 | 72.22 |
| $Al_2O_3$ | 5.40 | 5.40 | 5.40 | 5.40 | 5.70 | 5.40 |
| $B_2O_3$ | 9.50 | 9.50 | 9.50 | 9.50 | 9.50 | 9.50 |
| CaO | 0.40 | 0.40 | 0.40 | 0.40 | 0.40 | |
| BaO | 1.30 | 1.30 | 1.30 | 1.30 | 1.20 | 1.30 |
| $Na_2O$ | 5.1 | 5.50 | 5.75 | 5.30 | 5.70 | 5.45 |
| $K_2O$ | 2.35 | 2.35 | 1.70 | 2.35 | 2.30 | 2.35 |
| Cl | 0.08 | 0.08 | 0.08 | 0.08 | 0.08 | 0.08 |
| $Fe_2O_3$ | 1.20 | 1.20 | 1.20 | 1.20 | 1.20 | 1.20 |
| $TiO_2$ | 2.50 | 2.50 | 2.50 | 2.50 | 2.50 | 2.50 |
| $SnO_2$ | | | | | | |
| $Na_2O + K_2O$ | 7.45 | 7.85 | 7.45 | 7.65 | 8.00 | 7.80 |
| CaO + BaO | 1.70 | 1.70 | 1.70 | 1.70 | 1.60 | 1.30 |
| CaO/BaO | 0.31 | 0.31 | 0.31 | 0.31 | 0.33 | 0.00 |
| $10^{2.5}$ dPa·s (° C.) | 1,591 | 1,558 | 1,566 | 1,575 | 1,563 | |
| Working point ($10^4$ dPa·s) (° C.) | 1,180 | 1,156 | 1,160 | 1,168 | 1,158 | |
| Hydrolytic resistance (ml/g) | 0.0290 | 0.0320 | 0.0325 | 0.0305 | 0.0330 | |
| Linear thermal expansion coefficient (from 30° C. to 380° C.) | | | | 51.9 | 53.4 | |
| Transmittance at a wavelength of 450 nm (thickness: 1 mm) (%) | | | | 11 | | |

| Mass % | No. 7 | No. 8 | No. 9 | No. 10 | No. 11 |
|---|---|---|---|---|---|
| $SiO_2$ | 71.27 | 71.07 | 71.42 | 72.12 | 72.02 |
| $Al_2O_3$ | 5.90 | 5.90 | 5.90 | 5.40 | 5.40 |
| $B_2O_3$ | 9.50 | 9.50 | 9.50 | 9.50 | 9.50 |
| CaO | 0.40 | 0.40 | 0.40 | 0.20 | |
| BaO | 0.80 | 0.80 | 0.80 | 1.30 | 1.30 |
| $Na_2O$ | 5.45 | 5.65 | 5.55 | 5.40 | 5.70 |
| $K_2O$ | 2.90 | 2.90 | 2.65 | 2.35 | 2.35 |
| Cl | 0.08 | 0.08 | 0.08 | 0.08 | 0.08 |
| $Fe_2O_3$ | 1.20 | 1.20 | 1.20 | 1.15 | 1.15 |
| $TiO_2$ | 2.50 | 2.50 | 2.50 | 2.50 | 2.50 |
| $SnO_2$ | | | | | |
| $Na_2O + K_2O$ | 8.35 | 8.55 | 8.20 | 7.75 | 8.05 |
| CaO + BaO | 1.20 | 1.20 | 1.20 | 1.50 | 1.30 |
| CaO/BaO | 0.50 | 0.50 | 0.50 | 0.15 | 0.00 |

TABLE 1-continued

|  | | | | | |
|---|---|---|---|---|---|
| $10^{2.5}$ dPa·s (° C.) | 1,568 | 1,561 | 1,574 | 1,579 | 1,562 |
| Working point ($10^4$ dPa·s) (° C.) | 1,162 | 1,156 | 1,166 | 1,169 | 1,154 |
| Hydrolytic resistance (ml/g) | 0.0315 | 0.0310 | 0.0310 | 0.0295 | 0.0290 |
| Linear thermal expansion coefficient (from 30° C. to 380° C.) | 54.4 | 55.1 | 53.7 | | |
| Transmittance at a wavelength of 450 nm (thickness: 1 mm) (%) | | | | | |

TABLE 2

| Mass % | No. 12 | No. 13 | No. 14 | No. 15 | No. 16 |
|---|---|---|---|---|---|
| $SiO_2$ | 72.22 | 72.42 | 71.42 | 70.42 | 71.42 |
| $Al_2O_3$ | 5.40 | 5.40 | 5.90 | 6.40 | 6.15 |
| $B_2O_3$ | 9.50 | 9.50 | 10.00 | 10.50 | 9.75 |
| CaO | | | | | |
| BaO | 1.30 | 1.30 | 1.30 | 1.30 | 1.30 |
| $Na_2O$ | 5.50 | 5.30 | 5.30 | 5.30 | 5.30 |
| $K_2O$ | 2.35 | 2.35 | 2.35 | 2.35 | 2.35 |
| Cl | 0.08 | 0.08 | 0.08 | 0.08 | 0.08 |
| $Fe_2O_3$ | 1.15 | 1.15 | 1.15 | 1.15 | 1.15 |
| $TiO_2$ | 2.50 | 2.50 | 2.50 | 2.50 | 2.50 |
| $SnO_2$ | | | | | |
| $Na_2O + K_2O$ | 7.85 | 7.65 | 7.65 | 7.65 | 7.65 |
| CaO + BaO | 1.30 | 1.30 | 1.30 | 1.30 | 1.30 |
| CaO/BaO | 0.00 | 0.00 | 0.00 | 0.00 | 0.00 |
| $10^{2.5}$ dPa·s (° C.) | 1,557 | 1,567 | 1,584 | 1,579 | 1,592 |
| Working point ($10^4$ dPa·s) (° C.) | 1,162 | 1,168 | 1,178 | 1,174 | 1,180 |
| Hydrolytic resistance (ml/g) | 0.0273 | 0.0270 | 0.0270 | 0.0275 | 0.0270 |
| Linear thermal expansion coefficient (from 30° C. to 380° C.) | | | | | |
| Transmittance at a wavelength of 450 nm (thickness: 1 mm) (%) | | 8 | | 7 | |

| Mass % | No. 17 | No. 18 | No. 19 | No. 20 | No. 21 | No. 22 |
|---|---|---|---|---|---|---|
| $SiO_2$ | 70.42 | 71.42 | 70.42 | 72.42 | 72.92 | 72.42 |
| $Al_2O_3$ | 6.90 | 5.65 | 5.90 | 5.40 | 5.40 | 5.40 |
| $B_2O_3$ | 10.00 | 10.25 | 11.00 | 9.50 | 9.50 | 9.50 |
| CaO | | | | 0.40 | | 0.10 |
| BaO | 1.30 | 1.30 | 1.30 | 0.90 | 0.80 | 1.20 |
| $Na_2O$ | 5.30 | 5.30 | 5.30 | 5.30 | 5.30 | 5.30 |
| $K_2O$ | 2.35 | 2.35 | 2.35 | 2.35 | 2.35 | 2.35 |
| Cl | 0.08 | 0.08 | 0.08 | 0.08 | 0.08 | 0.08 |
| $Fe_2O_3$ | 1.15 | 1.15 | 1.15 | 1.15 | 1.15 | 1.15 |
| $TiO_2$ | 2.50 | 2.50 | 2.50 | 2.50 | 2.50 | 2.50 |
| $SnO_2$ | | | | | | |
| $Na_2O + K_2O$ | 7.65 | 7.65 | 7.65 | 7.65 | 7.65 | 7.65 |
| CaO + BaO | 1.30 | 1.30 | 1.30 | 1.30 | 0.80 | 1.30 |
| CaO/BaO | 0.00 | 0.00 | 0.00 | 0.44 | 0.00 | 0.08 |
| $10^{2.5}$ dPa·s (° C.) | 1,608 | | | | | |
| Working point ($10^4$ dPa·s) (° C.) | 1,193 | | | | | |
| Hydrolytic resistance (ml/g) | 0.0265 | 0.0281 | 0.0290 | 0.0305 | 0.0265 | 0.0285 |
| Linear thermal expansion coefficient (from 30° C. to 380° C.) | | | | | | |
| Transmittance at a wavelength of 450 nm (thickness: 1 mm) (%) | | | | | | |

TABLE 3

| Mass % | No. 23 | No. 24 | No. 25 | No. 26 | No. 27 | No. 28 | No. 29 | No. 30 | No. 31 | No. 32 | No. 33 |
|---|---|---|---|---|---|---|---|---|---|---|---|
| $SiO_2$ | 72.42 | 72.92 | 72.42 | 72.52 | 72.42 | 72.32 | 72.62 | 72.52 | 72.42 | 72.47 | 72.37 |
| $Al_2O_3$ | 5.40 | 5.40 | 5.40 | 5.40 | 5.40 | 5.40 | 5.40 | 5.40 | 5.40 | 5.40 | 5.40 |
| $B_2O_3$ | 9.50 | 9.50 | 9.50 | 9.50 | 9.50 | 9.50 | 9.50 | 9.50 | 9.50 | 9.50 | 9.50 |
| CaO | 0.20 | | | 0.10 | 0.10 | 0.10 | 0.10 | 0.10 | 0.10 | 0.10 | 0.10 |
| BaO | 1.10 | 1.30 | 1.30 | 1.20 | 1.20 | 1.20 | 1.20 | 1.20 | 1.20 | 1.20 | 1.20 |
| $Na_2O$ | 5.30 | 5.30 | 5.30 | 5.30 | 5.40 | 5.50 | 5.30 | 5.40 | 5.50 | 5.40 | 5.40 |
| $K_2O$ | 2.35 | 2.35 | 2.35 | 2.35 | 2.35 | 2.35 | 2.35 | 2.35 | 2.35 | 2.35 | 2.35 |
| Cl | 0.08 | 0.08 | 0.08 | 0.08 | 0.08 | 0.08 | 0.08 | 0.08 | 0.08 | 0.08 | 0.08 |
| $Fe_2O_3$ | 1.15 | 1.15 | 1.15 | 1.05 | 1.05 | 1.05 | 0.95 | 0.95 | 0.95 | 1.00 | 1.00 |
| $TiO_2$ | 2.50 | 2.00 | 2.50 | 2.50 | 2.50 | 2.50 | 2.50 | 2.50 | 2.50 | 2.50 | 2.60 |
| $SnO_2$ | | | | | | | | | | | |
| $Na_2O + K_2O$ | 7.65 | 7.65 | 7.65 | 7.65 | 7.75 | 7.85 | 7.65 | 7.75 | 7.85 | 7.75 | 7.75 |
| CaO + BaO | 1.30 | 1.30 | 1.30 | 1.30 | 1.30 | 1.30 | 1.30 | 1.30 | 1.30 | 1.30 | 1.30 |
| CaO/BaO | 0.18 | 0.00 | 0.00 | 0.08 | 0.08 | 0.08 | 0.08 | 0.08 | 0.08 | 0.08 | 0.08 |
| $10^{2.5}$ dPa · s (° C.) | | | | | | | 1,588 | 1,586 | 1,574 | 1,587 | |
| Working point ($10^4$ dPa · s) (° C.) | | | | | | | 1,174 | 1,174 | 1,165 | 1,173 | |
| Hydrolytic resistance (ml/g) | 0.0290 | | | | | | 0.0270 | 0.0280 | 0.0290 | | |
| Linear thermal expansion coefficient (from 30° C. to 380° C.) | | | | | | | | | | | |
| Transmittance at a wavelength of 450 nm (thickness: 1 mm) (%) | | 14 | 11 | | 13 | | 13 | 14 | 13 | 12 | |

TABLE 4

| Mass % | No. 34 | No. 35 | No. 36 | No. 37 | No. 38 | No. 39 |
|---|---|---|---|---|---|---|
| $SiO_2$ | 72.27 | 72.32 | 72.37 | 72.27 | 72.17 | 72.22 |
| $Al_2O_3$ | 5.40 | 5.40 | 5.40 | 5.40 | 5.40 | 5.40 |
| $B_2O_3$ | 9.50 | 9.50 | 9.50 | 9.50 | 9.50 | 9.50 |
| CaO | 0.10 | 0.10 | 0.10 | 0.10 | 0.10 | 0.10 |
| BaO | 1.20 | 1.20 | 1.20 | 1.20 | 1.20 | 1.20 |
| $Na_2O$ | 5.40 | 5.40 | 5.50 | 5.60 | 5.70 | 5.60 |
| $K_2O$ | 2.35 | 2.35 | 2.35 | 2.35 | 2.35 | 2.35 |
| Cl | 0.08 | 0.08 | 0.08 | 0.08 | 0.08 | 0.08 |
| $Fe_2O_3$ | 1.00 | 1.00 | 1.00 | 1.00 | 1.00 | 1.05 |
| $TiO_2$ | 2.70 | 2.65 | 2.50 | 2.50 | 2.50 | 2.50 |
| $SnO_2$ | | | | | | |
| $Na_2O + K_2O$ | 7.75 | 7.75 | 7.85 | 7.95 | 8.05 | 7.95 |
| CaO + BaO | 1.30 | 1.30 | 1.30 | 1.30 | 1.30 | 1.30 |
| CaO/BaO | 0.08 | 0.08 | 0.08 | 0.08 | 0.08 | 0.08 |
| $10^{2.5}$ dPa · s (° C.) | | | 1,585 | 1,568 | 1,563 | 1,569 |
| Working point ($10^4$ dPa · s) (° C.) | | | 1,172 | 1,161 | 1,157 | 1,162 |
| Hydrolytic resistance (ml/g) | | | 0.0280 | 0.0290 | | 0.0300 |
| Linear thermal expansion coefficient (from 30° C. to 380° C.) | | | 51.8 | 52.1 | | 52.6 |
| Transmittance at a wavelength of 450 nm (thickness: 1 mm) (%) | 10 | 10 | 14 | 14 | 14 | 12 |

| Mass % | No. 40 | No. 41 | No. 42 | No. 43 | No. 44 |
|---|---|---|---|---|---|
| $SiO_2$ | 72.32 | 72.12 | 70.60 | 71.70 | 70.60 |
| $Al_2O_3$ | 5.40 | 5.40 | 5.40 | 5.60 | 5.70 |
| $B_2O_3$ | 9.50 | 9.50 | 9.50 | 7.50 | 10.20 |
| CaO | 0.10 | 0.10 | 0.80 | 0.50 | 0.60 |
| BaO | 1.20 | 1.20 | 1.30 | 1.90 | 1.30 |
| $Na_2O$ | 5.55 | 5.75 | 5.80 | 5.90 | 5.50 |
| $K_2O$ | 2.35 | 2.35 | 2.40 | 1.10 | 1.40 |
| Cl | 0.08 | 0.08 | | | |
| $Fe_2O_3$ | 1.00 | 1.00 | 0.80 | 1.20 | 0.70 |
| $TiO_2$ | 2.50 | 2.50 | 2.70 | 4.20 | 3.10 |
| $SnO_2$ | | | 0.08 | 0.00 | 0.20 |
| $Na_2O + K_2O$ | 7.90 | 8.10 | 8.20 | 7.00 | 6.90 |
| CaO + BaO | 1.30 | 1.30 | 2.10 | 2.40 | 1.90 |

TABLE 4-continued

|  |  |  |  |  |  |
|---|---|---|---|---|---|
| CaO/BaO | 0.08 | 0.08 | 0.62 | 0.26 | 0.46 |
| $10^{2.5}$ dPa·s (° C.) | 1,573 |  | 1,526 | 1,575 | 1,555 |
| Working point ($10^4$ dPa·s) (° C.) | 1,166 |  | 1,138 | 1,183 | 1,142 |
| Hydrolytic resistance (ml/g) | 0.0295 |  | 0.0420 | 0.0370 | 0.0350 |
| Linear thermal expansion coefficient (from 30° C. to 380° C.) | 51.7 | 53.0 | 55.8 | 51.8 | 51.6 |
| Transmittance at a wavelength of 450 nm (thickness: 1 mm) (%) |  |  | 18 | 13 | 13 |

TABLE 5

| Mass % | No. 45 | No. 46 | No. 47 | No. 48 | No. 49 | No. 50 |
|---|---|---|---|---|---|---|
| $SiO_2$ | 69.87 | 70.32 | 70.62 | 68.57 | 69.97 | 70.37 |
| $Al_2O_3$ | 5.40 | 5.30 | 4.90 | 5.90 | 5.40 | 5.40 |
| $B_2O_3$ | 9.50 | 9.30 | 9.00 | 10.00 | 9.50 | 9.50 |
| CaO | 0.40 | 0.40 | 0.40 | 0.40 | 0.40 | 0.40 |
| BaO | 1.30 | 1.25 | 1.30 | 1.30 | 1.30 | 1.30 |
| $Na_2O$ | 5.30 | 5.20 | 5.30 | 5.30 | 5.30 | 5.30 |
| $K_2O$ | 2.35 | 2.30 | 2.35 | 2.35 | 2.35 | 2.35 |
| Cl | 0.08 | 0.08 | 0.08 | 0.08 | 0.08 | 0.08 |
| $Fe_2O_3$ | 1.20 | 1.25 | 1.20 | 1.25 | 1.10 | 1.20 |
| $TiO_2$ | 4.50 | 4.50 | 4.75 | 4.75 | 4.50 | 4.00 |
| $SnO_2$ | 0.10 | 0.10 | 0.10 | 0.10 | 0.10 | 0.10 |
| $Na_2O + K_2O$ | 7.65 | 7.50 | 7.65 | 7.65 | 7.65 | 7.65 |
| CaO + BaO | 1.70 | 1.65 | 1.70 | 1.70 | 1.70 | 1.70 |
| CaO/BaO | 0.31 | 0.32 | 0.31 | 0.31 | 0.31 | 0.31 |
| $10^{2.5}$ dPa·s (° C.) |  |  |  |  |  |  |
| Working point ($10^4$ dPa·s) (° C.) |  |  |  |  |  |  |
| Hydrolytic resistance (ml/g) |  |  |  |  |  |  |
| Linear thermal expansion coefficient (from 30° C. to 380° C.) |  |  |  |  |  |  |
| Transmittance at a wavelength of 450 nm (thickness: 1 mm) (%) | 9 | 8 | 10 |  | 11 | 13 |

The samples were each produced as described below.

First, 500 g of a batch was blended so as to give the composition shown in the table and melted at 1,650° C. for 3.5 hours in a platinum crucible. The content was stirred twice in the course of melting in order to reduce bubbles in the sample. After the melting, the resultant glass was rapidly cooled with a roller made of a metal, and was processed into shapes required for measurement and subjected to various evaluations. The results are shown in the tables. In each of Examples shown in Tables 1 to 4, the glass was melted so that the ratio of $Fe^{2+}$ to iron atoms contained in the glass was 60% or more. In addition, in each of Examples shown in Table 5, the glass was melted so that the ratio of $Fe^{2+}$ to iron atoms contained in the glass was less than 60%.

The working point was measured by a platinum sphere pull up method, and was determined as a temperature at which the glass had a viscosity of $10^{4.0}$ dPa·s. In addition, the temperature at which the glass had a viscosity of $10^{2.5}$ dPa·s was determined by the same method.

The hydrolytic resistance test was performed by a method in conformity with the European Pharmacopoeia 7.0. Detailed test procedures are as described below. The glass sample was crushed in an alumina mortar with an alumina pestle and classified into a particle diameter of from 300 μm to 425 μm with a sieve. The resultant powder was washed with ion exchanged water and acetone and dried in an oven at 140° C. 10 g of the powder sample after the drying was loaded into a quartz flask, and 50 mL of ion exchanged water was further added thereto and the flask was covered with a closure. The quartz flask including the sample was placed in an autoclave and subjected to treatment. The treatment conditions were as follows: a temperature was increased at a rate of 1° C./min from 100° C. to 121° C., and was then retained at 121° C. for 30 minutes, and was reduced at a rate of 0.5° C./min to 100° C. The solution in the quartz flask was transferred to another beaker, the quartz flask was further washed with 15 mL of ion exchanged water three times, and also the washing liquid was added to the beaker. A methyl red indicator solution was added to the beaker, and the content was titrated with a 0.02 mol/L hydrochloric acid solution. The amount of hydrochloric acid consumed until neutralization was achieved was read, and was converted to the consumption amount of hydrochloric acid per gram of glass. The resultant amount was shown in the tables. Even when the powder of the glass sample was washed with distilled water and ethanol instead of ion exchanged water and acetone, the same results are obtained.

The linear thermal expansion coefficient was measured with a dilatometer (NETZSCH DIL 402C) for a glass processed into a column shape measuring 20 mm in length by 5 mm in diameter. The linear thermal expansion coefficient was calculated from an elongation amount of the entire length of the glass within the temperature range of from 30° C. to 380° C.

The transmittance was measured with a spectrophotometer (SHIMADZU UV-2500) for a glass processed into a thickness of 1 mm and having a mirror-finished surface. A measurement wavelength range was set to from 200 nm to 800 nm, a slit width was set to 5 nm, a scan speed was set to a medium speed, and a sampling pitch was set to 1 nm. In each of Tables 1 to 5, a value for the "transmittance at a wavelength of 450 nm (thickness: 1 mm) (%)" is shown. The wavelength of 450 nm is a wavelength at which the highest transmittance value in the wavelength range of from 290 nm to 450 nm is obtained.

In the European Pharmacopoeia 7.0, an upper limit of the transmittance at a wavelength of from 290 nm to 450 nm is specified. The upper limit is set depending on the volume of a container. Containers each having a volume of from 2 mL to 20 mL may be processed from the glass having a thickness of 1 mm. In the case of the containers each having a volume within the above-mentioned range, the corresponding upper limits of the transmittance are as follows: 15% or less in the case of a volume of from 2 mL to 5 mL; 13% or less in the case of a volume of from 5 mL to 10 mL; and 12% or less in the case of a volume of from 10 mL to 20 mL.

The glass for a pharmaceutical container of the present invention manufactured under the above-mentioned conditions satisfied at least one of the upper limits of the transmittance at a wavelength of from 290 nm to 450 nm specified in the European Pharmacopoeia 7.0.

In addition, Sample Nos. 42 to 44 serving as Comparative Examples each had a high value for CaO+BaO and/or a high value for CaO/BaO, and hence had poor hydrolytic resistance.

INDUSTRIAL APPLICABILITY

The glass for a pharmaceutical container of the present invention is suitable as a glass for manufacturing a pharmaceutical container, such as an ampoule, a vial, a pre-filled syringe, or a cartridge.

Further, the glass for a container of the present invention is excellent in light shielding properties, and hence a content thereof is less liable to be altered through irradiation with light, and the glass is excellent in function of blocking ultraviolet light. In addition, the glass for a container of the present invention is excellent in hydrolytic resistance. Therefore, the glass for a container of the present invention is particularly suitable for the case in which the content thereof is to be protected from deterioration. For example, the glass for a container of the present invention may be suitably used for biotechnology applications, experimental instruments, such as a Petri dish and a beaker, a bottle for cosmetics, a bottle for beverages, a food container, or the like.

The invention claimed is:

1. A glass for a pharmaceutical container, which comprises as a glass composition, in terms of mass %, 67% to 81% of $SiO_2$, more than 4% to 7% of $Al_2O_3$, 7% to 14% of $B_2O_3$, 6% to 8.55% of $Na_2O+K_2O$, 0.8% to 1.8% of CaO+BaO, 0.1% to 1.8% of BaO, 0.5% to less than 2% of $Fe_2O_3$, and 1% to 5% of $TiO_2$, and satisfies a relationship of CaO/BaO≤0.4,
   wherein the glass has a transmittance at a wavelength of 450 nm that is 15% or less when having a thickness of 1 mm.

2. The glass for a pharmaceutical container according to claim 1, wherein the glass comprises as a glass composition, in terms of mass %, 70% to 78% of $SiO_2$, 5% to 7% of $Al_2O_3$, 8% to 11% of $B_2O_3$, 6% to 8.55% of $Na_2O+K_2O$, 0.8% to 1.8% of CaO+BaO, 0.8% to 1.2% of $Fe_2O_3$, and 2% to 5% of $TiO_2$, and satisfies a relationship of CaO/BaO≤0.3.

3. The glass for a pharmaceutical container according to claim 2, wherein the glass comprises as a glass composition, in terms of mass %, 9% to 11% of $B2O_3$.

4. The glass for a pharmaceutical container according to claim 1, wherein the glass comprises as a glass composition, in terms of mass %, 9% to 11% of $B_2O_3$.

5. The glass for a pharmaceutical container according to claim 1, wherein the glass has a consumption amount of 0.02 mol/L hydrochloric acid per unit glass mass 0.035 mL or less in a hydrolytic resistance test by a glass grains test method in conformity with the European Pharmacopoeia 7.0.

6. The glass for a pharmaceutical container according to claim 1, wherein the glass has a working point of 1,200° C. or less.

7. A glass tube for a pharmaceutical container, comprising the glass for a pharmaceutical container of claim 1.

8. A glass tube for a pharmaceutical container, comprising the glass for a pharmaceutical container of claim 2.

9. A glass tube for a pharmaceutical container, comprising the glass for a pharmaceutical container of claim 4.

10. A glass tube for a pharmaceutical container, comprising the glass for a pharmaceutical container of claim 5.

11. A glass tube for a pharmaceutical container, comprising the glass for a pharmaceutical container of claim 6.

12. A glass tube for a pharmaceutical container, comprising the glass for a pharmaceutical container of claim 3.

13. A glass for a container, which comprises as a glass composition, in terms of mass %, 67% to 81% of $SiO_2$, more than 4% to 7% of $Al_2O_3$, 7% to 14% of $B_2O_3$, 6% to 8.55% of $Na_2O+K_2O$, 0.8% to 1.8% of CaO+BaO, 0.1% to 1.8% of BaO, 0.5% to less than 2% of $Fe_2O_3$, and 1% to 5% of $TiO_2$, and satisfies a relationship of CaO/BaO≤0.4,
   wherein the glass has a transmittance at a wavelength of 450 nm that is 15% or less when having a thickness of 1 mm.

14. A glass tube for a container, comprising the glass for a container of claim 13.

* * * * *